United States Patent [19]

Mabie

[11] Patent Number: 4,466,660
[45] Date of Patent: Aug. 21, 1984

[54] MOVABLE BACKREST FOR TANDEM SEAT MOTORCYCLES

[76] Inventor: Earl Mabie, 60 Sherwood Dr., Hooksett, N.H. 03106

[21] Appl. No.: 350,646

[22] Filed: Feb. 22, 1982

[51] Int. Cl.³ .............................................. B62J 1/00
[52] U.S. Cl. ............................. 297/195; 297/DIG. 9; 297/375; 224/31; 280/289 E
[58] Field of Search ............... 297/195, 243, 298, 417, 297/383, DIG. 9, 443; 244/31, 42.01; 108/55.3; 280/289 E

[56] References Cited

U.S. PATENT DOCUMENTS

| 1,181,796 | 5/1916 | Pendleton | 297/DIG. 9 |
| 1,216,029 | 2/1917 | Whitaker | 297/DIG. 9 |
| 4,030,750 | 6/1977 | Abram | 297/DIG. 9 |
| 4,032,189 | 6/1977 | Benavente | 297/DIG. 9 |
| 4,186,937 | 2/1980 | Schultz | 280/289 E |
| 4,269,335 | 5/1981 | La Rose | 224/31 |

FOREIGN PATENT DOCUMENTS 2004372 10/1971 Fed. Rep. of Germany ...... 297/383
554424 4/1955 Italy .................................... 297/383

Primary Examiner—William E. Lyddane
Assistant Examiner—Peter A. Aschenbrenner
Attorney, Agent, or Firm—Pearson & Pearson

[57] ABSTRACT

A back rest assembly for the tandem seat of a motorcycle includes a bodily removable back rest with a pair of spaced, depending, parallel legs which can be fitted into any one of a plurality of pairs of oppositely disposed leg sockets mounted along a pair of elongated sub-frame pieces, the sub-frame pieces being fixed to the motorcycle to extend along opposite sides of the tandem seat. Thus, with no passenger, the driver can move the back rest forward. With a passenger, he moves it to the rear, or uses two back rests. The back rest pad tilts for comfort and the back rest legs are telescopably adjustable to raise or lower the pad.

13 Claims, 7 Drawing Figures

MOVABLE BACKREST FOR TANDEM SEAT MOTORCYCLES

BACKGROUND OF THE INVENTION

It has been the custom in tandem seat motorcycles to provide a commercially available sissy bar, to support the back of the passenger in the rear seat of a tandem seat and to rely on the passenger to support the back of the driver. There are also available combined back rests and carriers for the passenger in the rear seat, both the sissy bars and the back rest carriers usually comprising an inverted U-shaped member having an upstanding, rearwardly inclined back pad portion and a lower forwardly bent portion for attachment to the motorcycle.

It has been found that permanently mounting such back rests at the rear of the rearward seat is no help to a solo driver, having no passenger, on a trip of several hundred miles, the lack of back support often causing considerable pain and extensive tiring.

It has been proposed in U.S. Pat. No. 3,549,172 to McBroom of Dec. 22, 1970 to provide three hinged pads, one forming a driver's seat pad, the next forming either a passenger seat pad or a back rest pad for the driver and the third forming a back rest pad for the passenger. However, this device does not make use of the existing tandem seats on motorcycles, but substitutes new seats instead.

In U.S. Pat. No. 3,913,974 to Bowen of Oct. 21, 1975 a portion of the seat of the rear passenger pivots upwardly to form a back rest for the front seat, but as in the McBroom patent above, a special seat would be required rather than using the original equipment tandem seat.

SUMMARY OF THIS INVENTION

In this invention the tandem seats which are original equipment, on both United States and overseas produced motorcycles, continue to be used.

The back rest assembly of the invention includes a back rest provided with a suitable cushion, or pad in the upper portion and the lower portion includes a pair of spaced apart, parallel depending legs so that the back rest can straddle the tandem seat.

It also includes a pair of elongated frame pieces which are mounted along opposite sides of the rear seat, preferably several inches below seat level, and which have a plurality of pairs of oppositely disposed leg sockets spaced therealong.

It is, thus quickly and easily possible to slidably lift the back rest legs out of a rear pair of sockets, where the back rest supports the passengers back, move it forwardly and reinsert the legs in a pair of sockets where the back rest will support the back of the driver.

If an integral luggage rack is used on the back rest, the braces thereof serve as stops for the legs in the sockets. Otherwise, projecting pins or integral studs serve as the stops.

The cushion pad on the back rest is mounted on a ball and socket joint so that it will tilt to the desired comfortable angle.

The legs of the back rest are telescopably adjustable in height so that the pad height can also be adjusted for comfort.

DESCRIPTION OF A PREFERRED EMBODIMENT

Figure 1:
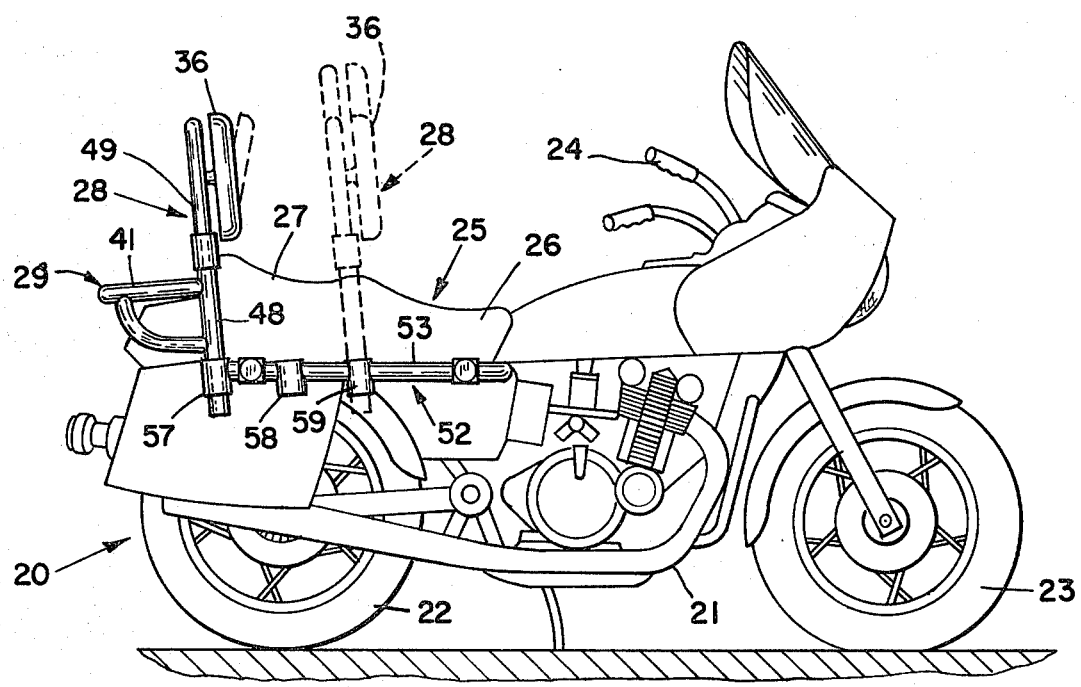
FIG. 1 is a side elevation of a typical motorcycle with tandem seat and with the back rest of the invention mounted thereon.
Figure 2:
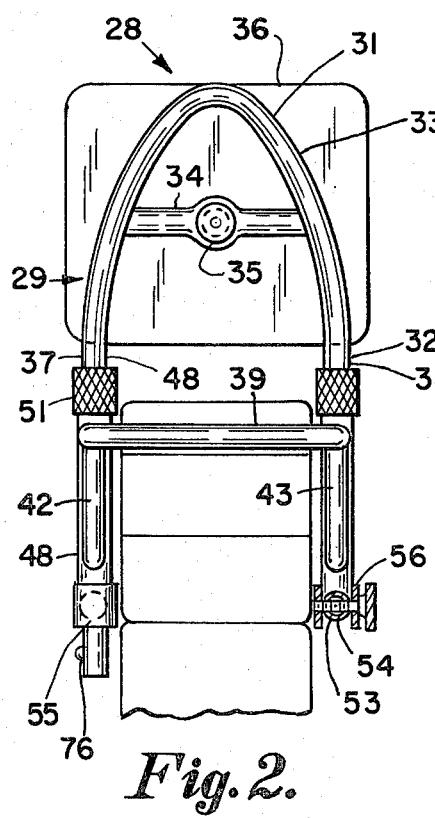
FIG. 2 is a rear elevation.
Figure 3:
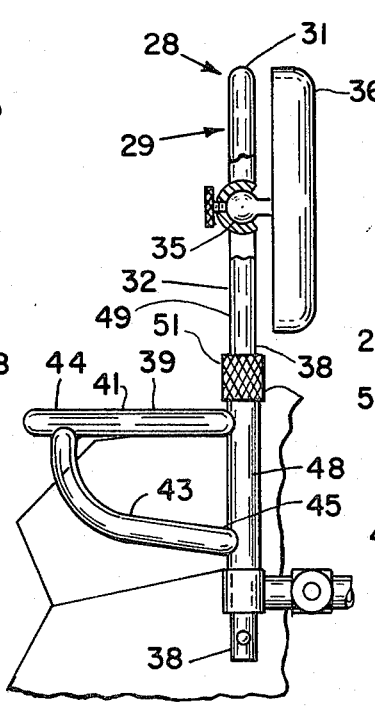
FIG. 3 is a side elevation.
Figure 4:
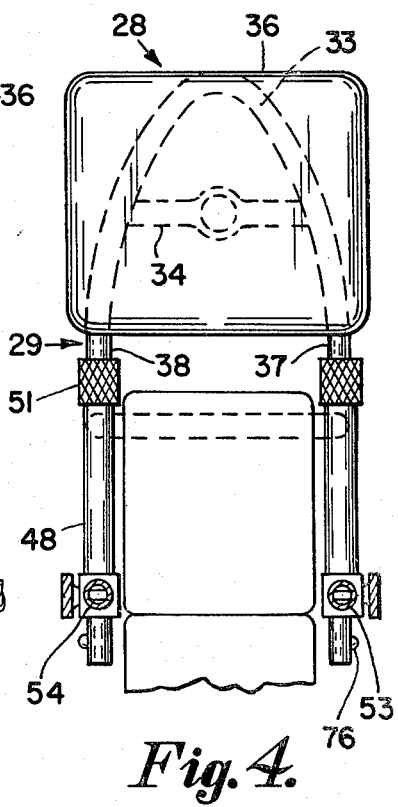
FIG. 4 a front elevation partly in section of one embodiment of the invention.

A typical motorcycle 20 is illustrated in the drawings, the motorcycle 20 having a frame 21, wheels 22 and 23, handle bars 24, and a tandem, or double, elongated seat 25, including the forward seat 26 for the driver and the rearward seat 27 for the passenger.

As shown in FIGS. 1-4 and FIG. 6 the back rest assembly 28 of the invention includes a bodily movable back rest 29, having an upper portion 31 and a lower portion 32. Back rest 29 preferably comprises an inverted U-shaped tubular frame 33, having the cross bar 34, there being a ball and socket joint 35 centrally of the cross bar which supports the pad 36 at desired angles of tilt. The lower portion 32 of back rest 29 comprises a pair of depending, substantially vertical, parallel, legs 37 and 38, spaced apart a predetermined distance to straddle the tandem seat 25. The legs 37 and 38 may be formed by the bottom portions of tubular frame 33 for convenience and simplicity.

Back rest 29 may include an integral luggage carrier 39 extending rearwardly of the upper portion 31 and having a carrier, or shelf, 41 supported by a pair of braces 42 and 43 each extending from the rear 44 of the shelf 41 downwardly to a leg 37 or 38 to thereby serve as a stop 45 to limit downward travel of the legs in their sockets.

Figure 6:
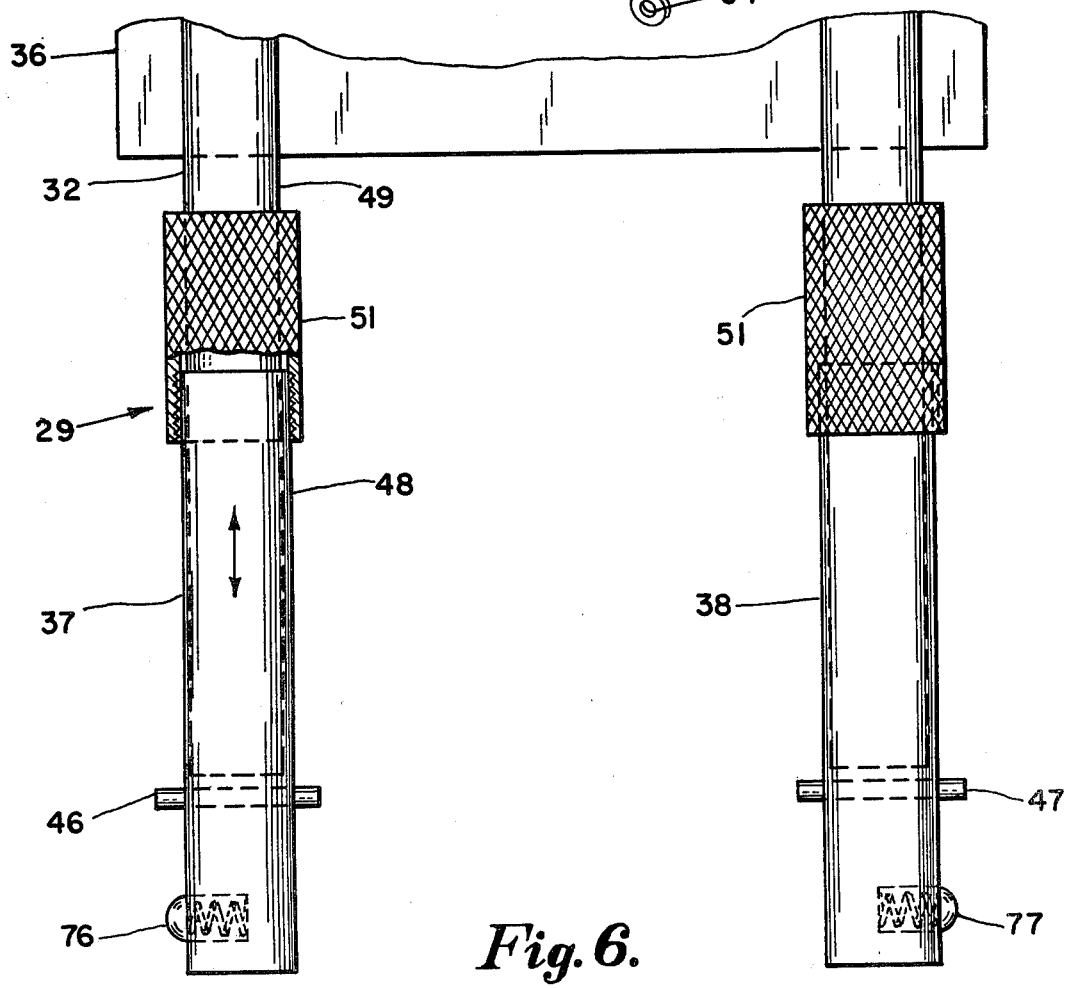
FIG. 6 is an enlarged, fragmentary front elevation of the lower portion of the back rest showing the telescope mechanism of the legs

As best shown in FIG. 6, if no luggage rack is used, a pair of pins, or integral studs, such as 46 or 47 form the limit stops, similar to stop 45. As also best shown in FIG. 6, the legs 37 and 38 are preferably telescopable and each formed by a lower hollow tube, of metal or the like, 48, in which an upper hollow tube of metal 49 is sleeved to telescope therein. A knurled compressor fitting 51 is provided to lock the tubes at selected positions to vary the height of the pad 36 for the comfort of the user, and to permit one tube to slide relative to the other when the fitting is untightened.

The back rest assembly 28 also includes support means 52 in the form of a pair of elongated sub-frame pieces, or bars, 53 and 54 each affixed to the motorcycle 20 to extend along at least the rear seat 27, in parallelism and generally horizontally. A plurality of hollow, tubular, substantially vertical, sockets such as 55 and 56, are spaced along each sub-frame piece 53 or 54 and arranged in oppositely disposed pairs such as 57, 58, or 59 adapted to slidably receive a pair of legs such as 37 and 38.

Figure 5:
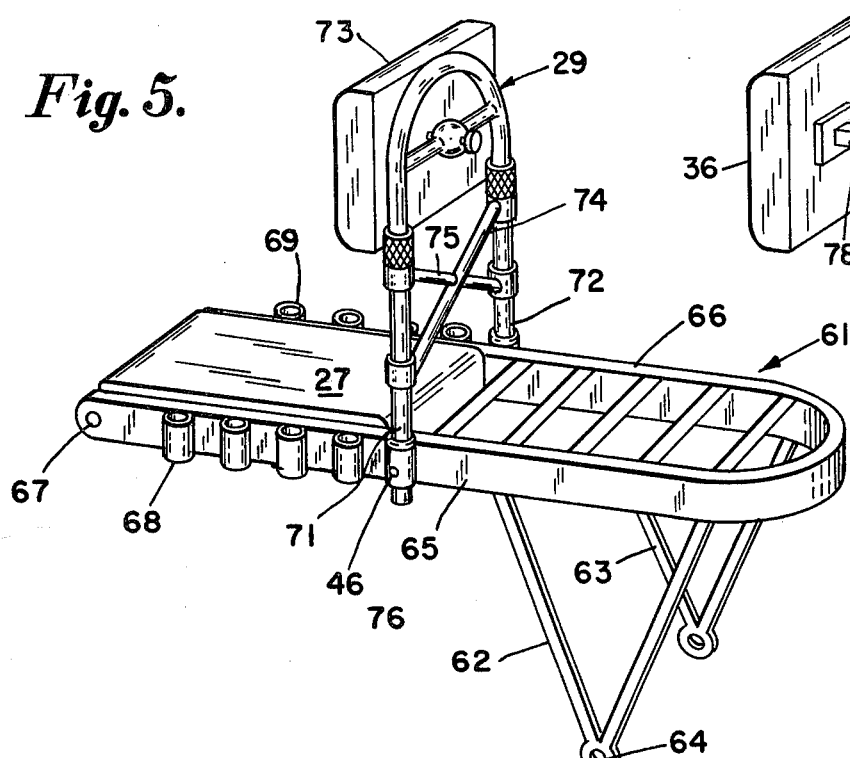
FIG. 5 is a perspective view of another embodiment of the invention
Figure 7:
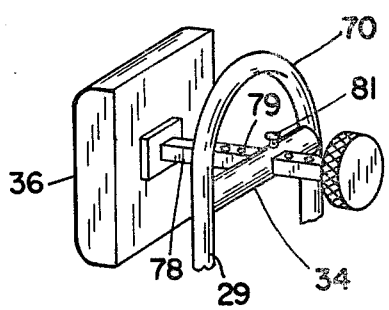
FIG. 7 is a fragmentary perspective view, similar to FIG. 5 of another embodiment of the invention.

Another embodiment of the invention is shown in FIG. 5 wherein the luggage rack 61 is supported by braces 62 and 63 from the axle 64 of the rear wheel 22 of motorcycle 20. The rack 61 includes a pair of integral bars 65 and 66, spaced to extend forwardly along each opposite side of a rear seat 27 and anchored at the free terminal front ends, such as 67, to a corresponding part of the frame of the seat 25. Each bar 65 and 66 carries a plurality of spaced tubular sockets 68 or 69 arranged to seat the legs 71 or 72 of the back rest 73. A pair of cross braces 74 and 75 extend between the legs 71 and 72.

In operation, the support means 52 consisting of horizontal, elongated bars, or frame pieces 53 and 54 or 65 and 66, is affixed to the motorcycle several inches below the level of tandem seat 25. A back rest 29 or 73 may then have its legs 37 and 38, or 71, and 72 slid downwardly into a rear pair of sockets, if there is a passenger or into a forward pair of sockets if the driver is solo.

The stops 46 and 47 limit downward movement of the lower tubes 48 in the sockets 55 or 56 or sockets 68 or 69 and one or more spring biased buttons 76 or 77 limit upward movement therein until finger pressed for release.

In lieu of moving the entire back rest 29, relative to support means 52, the pads 36 or 73 may be movable forwardly and rearwardly relative to their respective back rests 29 or 73 on a bar 78 having spaced perforations 79 for a spring pressed pin 81 in the cross bar 34 or 74. One or more such bars 78 may be used and the means for moving the pad relative to the backrest may be a piston and cylinder, folding levers, helically threaded thrust screws, or other suitable mechanism.

I claim:

1. In a motorcycle of the type having tandem, double seats including a forward seat for the driver and a rearward seat for a passenger, the combination of:
   a back rest assembly comprising;
   a back rest having an upper portion with a back rest pad and a lower portion having a pair of depending parallel, spaced apart, legs;
   and support means including a pair of elongated sub-frame pieces, each affixed to said motorcycle to extend along one of the opposite sides of said tandem seats;
   said sub-frame pieces each having a row of spaced, leg sockets therealong, forming a plurality of pairs of opposed sockets for slidably receiving the spaced apart legs of said back rest to selectively support said back rest in rear of said forward seat, in rear of said rearward seat, or at selected locations therebetween.

2. A motorcycle back rest assembly as specified in claim 1 wherein:
   said back rest comprises an inverted U-shaped tubular frame having a cross bar across said upper portion, and includes a ball and socket joint, centrally of said cross bar, supporting said back rest pad;
   whereby said pad may be selectively tilted to desired angles.

3. A motorcycle back rest assembly as specified in claim 1 wherein:
   said back rest includes an integral luggage rack, extending rearwardly from said upper portion, below the level of said pad, and above the level of said spaced apart legs.

4. A motorcycle back rest assembly as specified in claim 1 wherein:
   the parallel spaced apart depending legs of said back rest each include a stop projecting therefrom to limit the downward sliding movement of said legs in said sockets.

5. A motorcycle back rest assembly as specified in claim 1 wherein:
   The parallel spaced apart depending legs of said back rest are telescopable and each includes a locking ferrule for adjusting the height of the legs.

6. In combination with a motorcycle having an elongated seat for a driver and passenger:
   a movable back rest comprising;
   a pair of parallel bars, each on an opposite side of and detachably affixed to said motorcycle along said seat;
   a plurality of pairs of tubular sockets, the sockets of each pair being spaced along one of said bars; and
   at least one back rest, having a pair of depending parallel legs, each said leg slidably and selectively fitting in one of the sockets of one of said pairs of sockets.

7. A back rest assembly, for a tandem motorcycle seat, said back rest assembly comprising:
   a pair of parallel, elongated sub-frame, pieces affixed to said motorcycle and each extending along one of the opposite sides of at least the rearward seat of said tandem seat;
   a plurality of oppositely disposed, substantially vertical, tubular sockets on each said sub-frame piece;
   and a bodily removable back rest having a pair of spaced apart, legs depending substantially vertically therefrom;
   said legs being adapted to straddle said seat and be slidably received in any one of said oppositely disposed pairs of sockets for removably supporting said back rest.

8. A combination as specified in claim 7 wherein:
   said legs are telescopable and include means for adjusting each said leg at selected telescoped positions.

9. A combination as specified in claim 7 wherein:
   said back rest includes a pad and a ball and socket joint supporting said pad on said back rest to permit said pad to move to various angles of tilt relative to said back rest.

10. A combination as specified in claim 7 wherein:
    said back rest includes a luggage rack extending rearwardly therefrom, said rack having an integral brace on each opposite side, each extending from proximate the rear of the rack forwardly to just above one of said legs;
    said brace serving as a stop to limit the travel of its leg down into its socket.

11. A combination as specified in claim 7 wherein;
    said back rest includes a pad and means supporting said pad on said back rest for selective horizontal movement therebetween.

12. A combination as specified in claim 7 wherein;
    said legs of said bodily removable back rest each include stop means for limited downward movement in said sockets and spring biased, button, stop means for limiting upward movement in said sockets.

13. In a motorcycle having tandem, double seats, including a forward seat for the driver and a rearward seat for a passenger, the combination of
    a back rest having an upper portion with a back rest pad and a lower portion having a pair of depending parallel, spaced apart legs;

support means including a pair of elongated sub-frame pieces, each affixed to said motorcycle to extend along one of the opposite sides of said tandem seats; and leg socket means spaced along each of said sub-frame pieces for selectively receiving the legs of said back rest in a rearward position back of said rearward seat or a forward position in back of said driver's seat.

* * * * *